(12) United States Patent
Chiou et al.

(10) Patent No.: US 7,739,700 B2
(45) Date of Patent: Jun. 15, 2010

(54) INSERTION-PROOF DEVICE FOR OPTICAL DISK DRIVE

(75) Inventors: Yao-Jia Chiou, Taoyuan County (TW); Jen-Chen Wu, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 582 days.

(21) Appl. No.: 11/689,044

(22) Filed: Mar. 21, 2007

(65) Prior Publication Data

US 2007/0277188 A1 Nov. 29, 2007

(30) Foreign Application Priority Data

May 26, 2006 (TW) .............................. 95118952 A

(51) Int. Cl.
*G11B 17/04* (2006.01)
(52) U.S. Cl. ...................................... 720/620; 720/647
(58) Field of Classification Search ........................ None
See application file for complete search history.

(56) References Cited

U.S. PATENT DOCUMENTS

| | | | | |
|---|---|---|---|---|
| 4,691,257 A | * | 9/1987 | Taguchi .................... | 360/97.02 |
| 4,764,917 A | * | 8/1988 | Sugihara et al. ............. | 720/623 |
| 5,084,855 A | * | 1/1992 | Kobayashi et al. .......... | 720/647 |
| 5,537,378 A | * | 7/1996 | Uehara et al. ............. | 369/30.75 |
| 6,751,180 B2 | * | 6/2004 | Tanaka et al. ............... | 720/623 |
| 7,013,471 B2 | * | 3/2006 | Yoshimura .................. | 720/620 |
| 2003/0002422 A1 | * | 1/2003 | Hasegawa et al. .......... | 369/77.1 |
| 2004/0221301 A1 | * | 11/2004 | Azai .......................... | 720/619 |
| 2005/0138651 A1 | * | 6/2005 | Liao et al. .................. | 720/619 |

* cited by examiner

*Primary Examiner*—Craig A. Renner
*Assistant Examiner*—Tamara Ashford
(74) *Attorney, Agent, or Firm*—Thomas, Kayden, Horstemeyer & Risley

(57) ABSTRACT

An insertion-proof device for optical disk drive is provided to prevent other discs from being inserted in the operating disk drive. A slider moves back and forth along the optical disk drive to load and unload a disc. A push head is disposed on one end of the slider near an entrance. A protrusion is extended backward from the protection unit and disposed on the moving path of the slider. At least one supporting arm is extended from the protection unit. After a disc is loaded, the push head pushes the protrusion, so that the protection unit rotatably fixed near the entrance is turned upward to cover part of the entrance to prevent other discs from being inserted in the operating disk drive. When unloading a disc, the push head releases the protrusion, so that the protection unit leaves the entrance for the original position.

14 Claims, 3 Drawing Sheets

INSERTION-PROOF DEVICE FOR OPTICAL DISK DRIVE

This application claims the benefit of Taiwan application Serial No. 95118952, filed May 26, 2006, the subject matter of which is incorporated herein by reference.

BACKGROUND OF THE INVENTION

1. Field of the Invention

The invention relates in general to an insertion-proof device for an optical disk drive, and more particularly to an insertion-proof device used to prevent other discs from being inserted in a slot-in type optical disk drive already having a disc loaded within.

2. Description of the Related Art

The optical disk drives mainly has two categories of tray type and slot-in type. According to the tray type optical disk drive, the disc is placed on a tray and loaded into optical disk drive along with the tray. The panel at the front end of the tray is embedded into the optical disk drive to shut the entrance, lest the operating disc might be interfered with. The slot-in type optical disk drive uses guiding rods or a roller set to directly guide the disc to be loaded or unloaded. As the entrance is always open, the user may accidentally insert another disc, interfering with the operating disc or even damaging the optical disk drive.

In order to protect the operating optical disk drive and disc, conventional slot-in type optical disk drive disposed a protection unit near the entrance to prevent other discs from being inserted when the optical disk drive is operating. In order to move the protection unit in and out of the optical disk drive along with the disc, conventional slot-in type optical disk drive includes a gear set or a linking rod set for driving the protection unit so that the entrance of the optical disk drive is opened for loading the disc and then closed after the disc is loaded, thereby protecting the operation of the optical disk drive, and further preventing other discs from being inserted in the optical disk drive which already has the disc loaded within. However, the gear set or the linking rod set are additional added. Thus, the transmission design of the optical disk drive becomes complicated, the manufacturing cost increases, and the market competitiveness of the product reduces. Besides, both of the gear set and the linking rod set have several transmission components. As long as one of the transmission components fails, the protection unit becomes disabled, resulting in instability of the transmission. Therefore, there is a need to improve the protection mechanism to prevent other discs from being inserted in the optical disk drive which already has the disc loaded within.

SUMMARY OF THE INVENTION

The invention is directed to an insertion-proof device for an optical disk drive. The protection unit is driven by the existing slider of the optical disk drive, so that the transmission mechanism and parts of the optical disk drive are simplified and the manufacturing cost is reduced.

According to a first aspect of the present invention, an insertion-proof device for an optical disk drive is provided. The protection unit is controlled via a simple cam mechanism, so that the product reliability is improved.

To achieve the above object of the invention, an insertion-proof device for optical disk drive is provided to prevent other discs from being inserted in the operating disk drive. A slider moves back and forth along the optical disk drive to load and unload a disc. A push head is disposed on one end of the slider near an entrance. A protrusion is extended from the protection unit and disposed on the moving path of the slider. At least one supporting arm is extended from the protection unit. After a disc is loaded, the push head pushes the protrusion, so that the protection unit rotatably fixed near the entrance is turned upward to cover part of the entrance to prevent other discs from being inserted in the operating disk drive. When unloading a disc, the push head releases the protrusion, so that the protection unit leaves the entrance for the original position.

The invention will become apparent from the following detailed description of the preferred but non-limiting embodiments. The following description is made with reference to the accompanying drawings.

DETAILED DESCRIPTION OF THE INVENTION

The technology and means adopted in the invention to achieve the above effect are exemplified below in a preferred embodiment with accompanied drawings.

Figure 1:
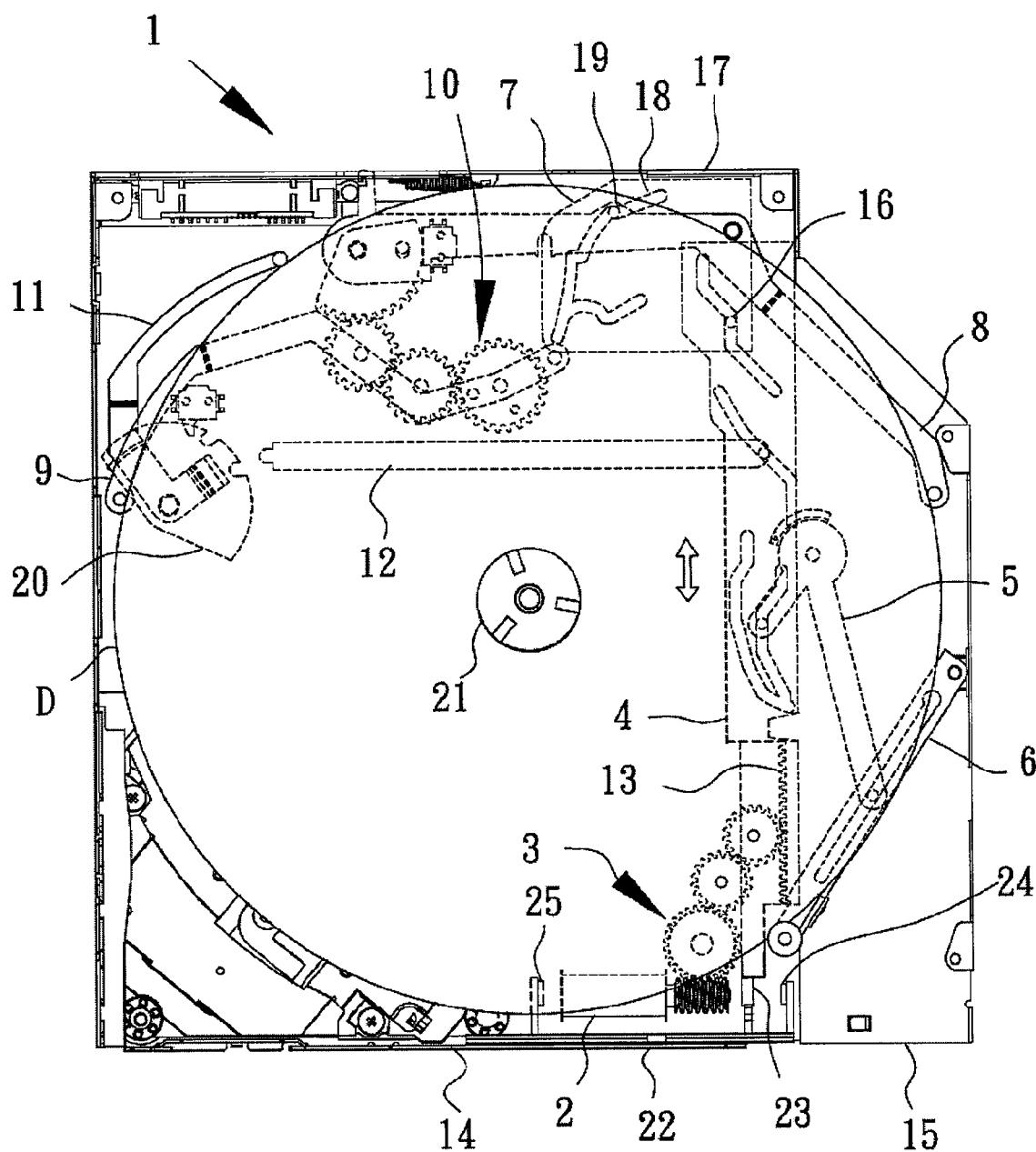
FIG. 1 illustrates a top view of the internal structure of a slot-in type optical disk drive according to a preferred embodiment of the invention.

Referring to FIG. 1, a top view of the internal structure of a slot-in type optical disk drive according to the preferred embodiment of the invention is shown. The slot-in type optical disk drive 1 mainly comprises a drive motor 2, a transmission unit 3, a slider 4, a disc-loading connecting rod 5, a disc-loading guiding rod 6, a slide plate 7, a first positioning rod 8, a second positioning rod 9, a linking gear set 10, a disc-unloading guiding rod 11 and a push rod 12. The optical disk drive 1 rotates the transmission unit 3 composed of a gear set by the drive motor 2 first, and then the transmission unit 3 drives the slider having a rack 13 to move towards the entrance 14 of the optical disk drive 1. A number of slide grooves are respectively disposed on the slider 4 for driving the loading/unloading mechanism comprising the disc-loading connecting rod 5, the slide plate 7 and the push rod 12. One end of the disc-loading connecting rod 5 moves on the slide groove of the disc-loading guiding rod 6, so that the disc-loading guiding rod 6 whose one end is fixed on the housing 15 pushes the disc D already inserted in the optical disk drive 1 from outside to further load the disc D into the optical disk drive 1.

The sliding pin 16 on the slide plate 7 is driven by the slide groove on the slider 4, so that the slide plate 7 moves linearly under the restriction of the track 17, and the guide slot 18 guides the protruding pin 19 of the first positioning rod 8 to move and drive the first positioning rod 8. As the linking gear set 10 whose one end is linked to the first positioning rod 8 is rotated, the second positioning rod 9 linked to the other end of the linking gear set 10 is rotated at the same time, so that the second positioning rod 9 and the first positioning rod 8 are both stretched to load the disc D to a predetermined position. Lastly, the push rod 12 is driven by the slide groove of the slider 4 to support the sector turntable 20 linked to the disc-unloading guiding rod 11 for enabling the disc-unloading guiding rod 11 to be released from the edge of the disc D. Meanwhile, with the design of the slide groove of the slider 4 and the guide slot 18 of the slide plate 7, the disc-loading guiding rod 6, the first positioning rod 8 and the second positioning rod 9 are all released from the edge of the disc D, and the disc D is rotated by the spindle motor 21 to be loaded into the disc drive. When unloading a disc, the drive motor 2 is rotated reversely, so that the transmission unit 3 rotates the sector turntable 20 for enabling the disc-unloading guiding rod 11 to push the disc D out. Meanwhile, as the drive motor 2 is rotated, the transmission unit 3 drives the slider 4 towards the inside of the optical disk drive 1, so that the disc-loading connecting rod 5, the slide plate 7 and the push rod 12 are moved in an opposite direction. Also, the disc-loading guiding rod 6, the first positioning rod 8 and the second positioning rod 9 linked together are moved in an opposite direction to guide the disc D to be unloaded from the optical disk drive 1.

When the slider 4 of the slot-in type optical disk drive 1 guides the disc D to be loaded or unloaded, the drive motor 2 rotates the transmission unit 3 to drive the rack 13 of the slider 4, so that the slider moves forward and backward along the optical disk drive 1 in the course of loading or unloading a disc. The insertion-proof device of the invention, which uses the slider as the driving force, mainly comprises a protection unit 22 and a push head 23. The protection unit 22 is rotatably fixed on the brackets 24 and 25 of the housing 15, and the push head 23 is disposed at the front end of the slider 4.

Figure 2:
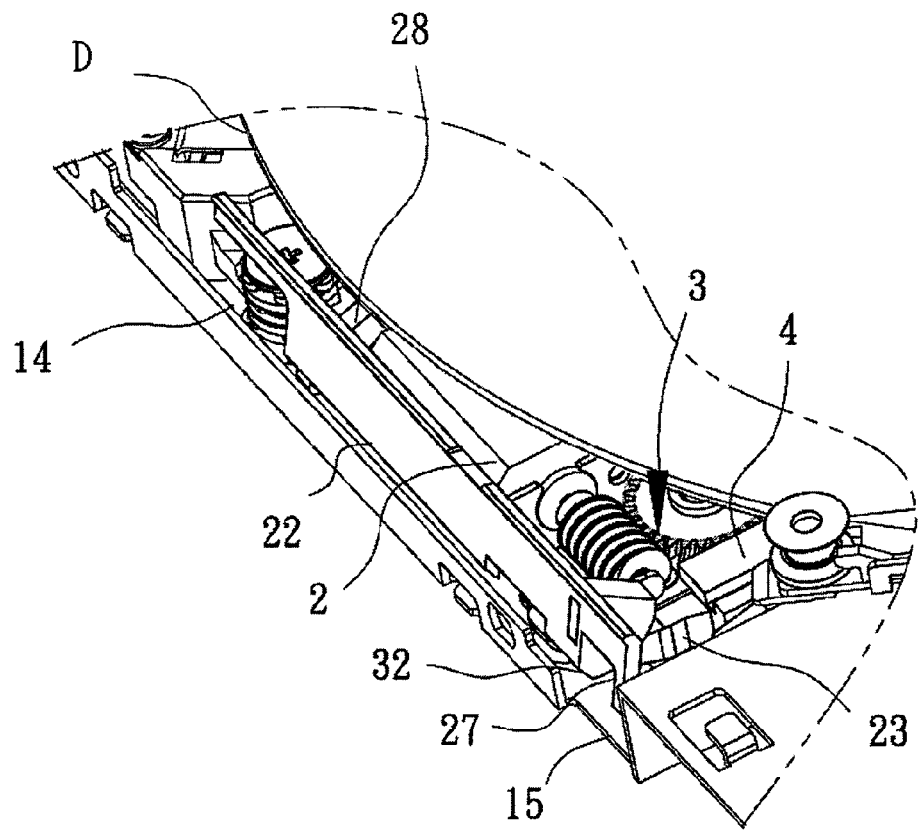
FIG. 2 illustrates a partial enlarged perspective view of an insertion-proof device for optical disk drive according to the preferred embodiment of the invention.
Figure 3:
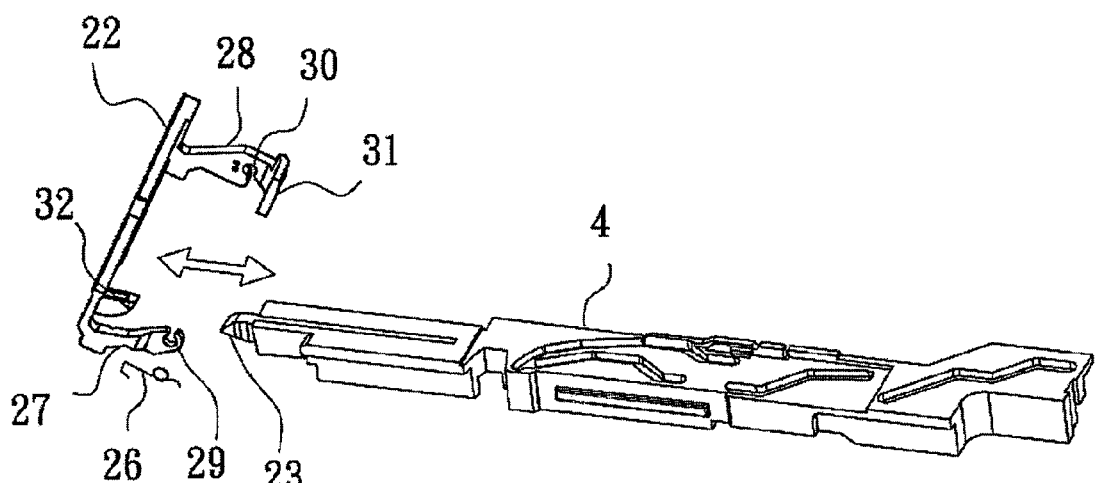
FIG. 3 illustrates an exploded diagram of the insertion-proof device according to the preferred embodiment of the invention.

As indicated in FIG. 2, a partial enlarged perspective view shows the relative position between the protection unit 22 and the push head 23 in the slot-in type optical disk drive 1. The protection unit 22 is a door sheet disposed outside the drive motor 22 and covers only part of the entrance 14 to form a barrier for entrance and exit. Also referring to FIG. 3, an exploded perspective view of the protection unit 22, the restoring spring 26 and the slider 4 is shown. The ends of the protection unit 22 are extended backward to form two supporting arms 27 and 28. The supporting arms 27 and 28 have the fixing holes 29 and 30, respectively disposed near the back end of the supporting arms 27 and 28, are rotatably fixed on the brackets 24 and 25 of the housing 15 (referring to FIG. 1) near the entrance, so that the protection unit 22 may turn upward and downward around the fixing holes 29 and 30. One end of the restoring spring 26 is fixed on the bracket 24 of the housing 15 and the other end presses the supporting arm 27, so that the protection unit 22 remains being off the entrance 14. The supporting arm has a limiting protrusion 31 disposed at the back end of the supporting arm 28 near the middle of the entrance 14 for preventing the disc D from being tiltedly inserted into the entrance 14 at a large angle, lest the internal components of the optical disk drive 1 might be touched and damaged. Meanwhile, a piece of flannelette is spread over the limiting protrusion 31, lest the disc D might be scratched. Further, a protrusion 32 is extended backward from the protection unit 22 and disposed on the moving path of the slider, wherein the bottom surface of the protrusion 32 is a cambered surface. A push head 23 is disposed at the front end of the slider 4 near the entrance 14, and is projected from the slider 4 and opposite to the protrusion 32 of the protection unit 22, wherein the top surface of the push head 23 is a cambered surface. The push head 23 and the protrusion 32 of the protection unit 22 form a cam transmission mechanism.

Figure 4:
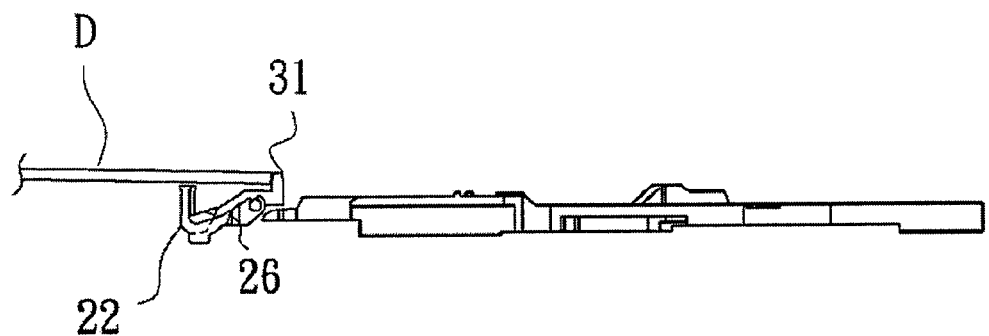
FIG. 4 illustrates the insertion of a disc according to the preferred embodiment of the invention.
Figure 5:
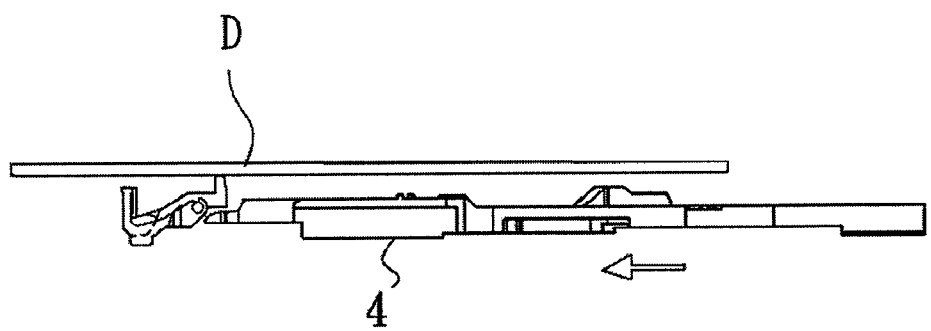
FIG. 5 illustrates the loading of a disc according to the preferred embodiment of the invention.
Figure 6:
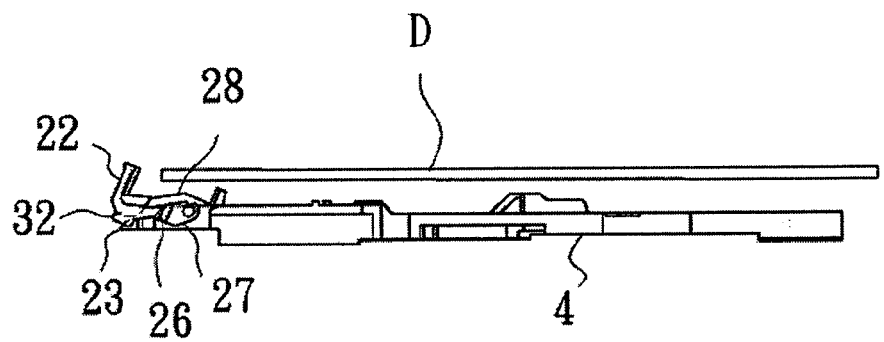
FIG. 6 illustrates the positioning of a disc according to the preferred embodiment of the invention.

The movement of the insertion-proof device according to the preferred embodiment of the invention is shown in FIG. 4. When the disc D is inserted to the optical disk drive, the protection unit 22 will keep the entrance unobstructed by the weight of the protection unit 22 itself or by the function of the restoring spring 26. If the disc D is too tiltedly inserted to the disc drive, the front end of the disc D will be obstructed by the limiting protrusion 31 and can not move further unless the disc D is inserted at an angle above the horizontal line, lest the internal components of the disc D or the optical disk drive might be damaged. As indicated in FIG. 5, when the optical disk drive detects that the disc D is being inserted, the optical disk drive drives the slider 4 to move to the front end and brings the loading/unloading mechanism of the optical disc drive to load the disc D. As indicated in FIG. 6, after the slider guides the disc D to a predetermined position, the push head 23 disposed at the front end of the slider 4 touches the protrusion 32 of the protection unit 22, and the cambered surface of the push head 23 smoothly pushes the cambered surface at the bottom surface of the protrusion 32 to raise the protrusion 32, so that the protection unit 22 turns upward around the fixing hole of the supporting arms 27 and 28 and blocks part of the entrance 14 to prevent other discs from being inserted to the disc drive. When unloading a disc, the slider 4 moves backward, so that the push head 23 is separated from the protrusion 32 and the protection unit 22 is released. The protection unit 22 keeps the entrance 1 unobstructed by the weight of the protection unit 22 itself or by the function of the restoring spring 26 to facilitate the loading and unloading of a disc.

According to the insertion-proof device for optical disk drive of the invention, the existing protection unit and slider for loading/unloading mechanism of a slot-in type optical disk drive are modified and slightly reshaped to form a simple yet reliable cam linking mechanism for driving a protection unit. By turning the protection unit properly, abnormal insertion of disc is prevented without using extra parts or expensive gear set or connecting rod set. Consequently, the transmission mechanism and parts of the optical disk drive are simplified and the cost is reduced. Despite the above embodiment is exemplified by a large-scale disc, the slider 4 is also applicable to small-scale discs. The distance of movement is different when the size of the disc changes. However, as long as the position or shape of the push head 23 and the protrusion 32 are adjusted, the object and function of the invention still can be achieved and are within the scope of protection of the invention.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An insertion-proof device in an optical disk drive having an entrance, wherein the insertion-proof device comprises:
    a slider for driving a disc to be loaded or unloaded, wherein a push head is disposed at one end of the slider near the entrance; and
    a protection unit, comprising:
        at least one supporting arm extended from the protection unit and rotatably fixed near the entrance, wherein a limiting protrusion is disposed at a back end of the supporting arm and below a route of insertion of the disc, and wherein when the disc is tiltedly inserted to the optical disk drive, the limiting protrusion obstructs a front edge of the disc; and a protrusion extended from the protection unit and disposed on a moving path of the slider, wherein when the optical disk drive loads the disc, the push head pushes the protrusion so that the protection unit turns upward to cover part of the entrance to prevent other discs from being inserted to the optical disk drive.

2. The insertion-proof device for optical disk drive according to claim 1, wherein the optical disk drive further comprises a drive motor and a transmission unit, the slider is driven by the drive motor via the transmission unit to move back and forth along the optical disk drive for loading and unloading a disc.

3. The insertion-proof device for optical disk drive according to claim 2, wherein the slider moves towards the entrance of the optical disk drive when loading a disc.

4. The insertion-proof device for optical disk drive according to claim 1, wherein the push head is projected from the slider, a top surface of the push head is a cambered surface, and a bottom surface of the protrusion is a cambered surface.

5. The insertion-proof device for optical disk drive according to claim 1, wherein the push head and the protrusion form a cam linking mechanism.

6. The insertion-proof device for optical disk drive according to claim 1 further comprising a bracket near the entrance, and the supporting arm is rotatably fixed on the bracket.

7. The insertion-proof device for optical disk drive according to claim 6, wherein the supporting arm having a fixing hole disposed near a back end of the supporting arm to be rotatably fixed on the bracket.

8. The insertion-proof device for optical disk drive according to claim 6, wherein the protection unit has two supporting arms respectively extended from two ends of the protection unit, each of the supporting arms has a fixing hole disposed near a back end of each of the supporting arm to be rotatably fixed on the bracket.

9. The insertion-proof device for optical disk drive according to claim 1, wherein the protection unit is a door sheet.

10. The insertion-proof device for optical disk drive according to claim 1, wherein the protection unit covers part of the entrance.

11. The insertion-proof device for optical disk drive according to claim 1, further comprising a restoring spring, wherein one end of the restoring spring is fixed on the protection unit and the other end of the restoring spring is fixed on the optical disk drive, so that the protection unit maintains being off the entrance.

12. The insertion-proof device for optical disk drive according to claim 11, wherein one end of the restoring spring is fixed on the supporting arm of the protection unit.

13. The insertion-proof device for optical disk drive according to claim 1, wherein the supporting arm is near the middle of the entrance.

14. The insertion-proof device for optical disk drive according to claim 1, wherein the surface of the limiting protrusion is covered by a piece of flannelette.

* * * * *